Arvil J. Torbett
INVENTOR

Patented Aug. 26, 1941

2,253,541

UNITED STATES PATENT OFFICE 2,253,541

TREE CUP

Arvil J. Torbett, United States Navy

Application April 3, 1940, Serial No. 327,610

1 Claim. (Cl. 43—108)

(Granted under the act of March 3, 1883, as amended April 30, 1928; 370 O. G. 757)

This invention relates to a tree cup and has for an object to provide an improved tree cup of simple and inexpensive construction which can be easily applied to any type of growing tree and will serve to effectively prevent crawling insects from ascending the trunk of the tree to damage the fruit or foliage thereof. A further object of this invention is to provide a tree cup which will remain in effective operative position even though unattended for long periods of time and which will be self-adjusting to the increase in diameter of the tree as it grows. Another object of this invention is to provide a tree cup protector which may be applied so as to have a snug fit against the surface of the tree irrespective of any irregularities in such surface and which will retain the snug fit as the tree grows. A yet further object of this invention is to provide a tree cup made of a single piece of sheet material, preferably of sheet lead or other materials having similar stiff yet yieldable qualities.

With the foregoing and other objects in view as will hereinafter become apparent, this invention comprises the constructions, combinations and arrangements of parts hereinafter disclosed, claimed and illustrated in the accompanying drawing in which:

Figure 1:
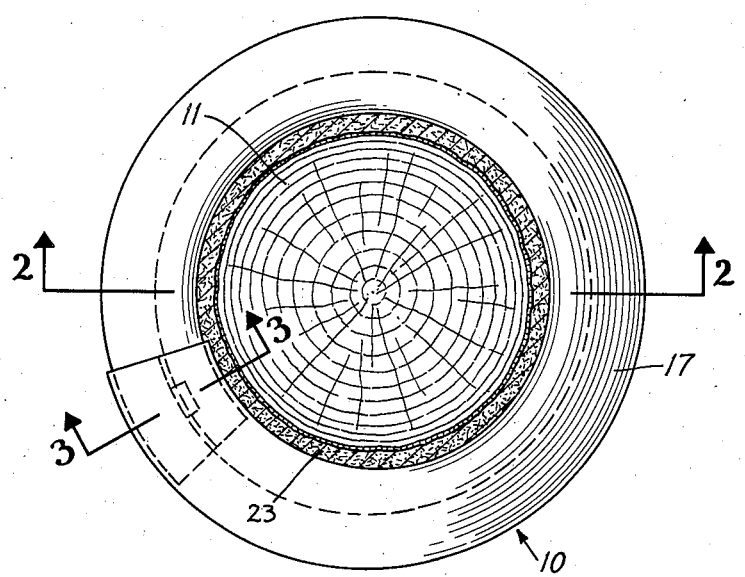
Fig. 1 is a top plan view of the tree cup in operative position being on line 1—1 of Fig. 2.
Figure 2:
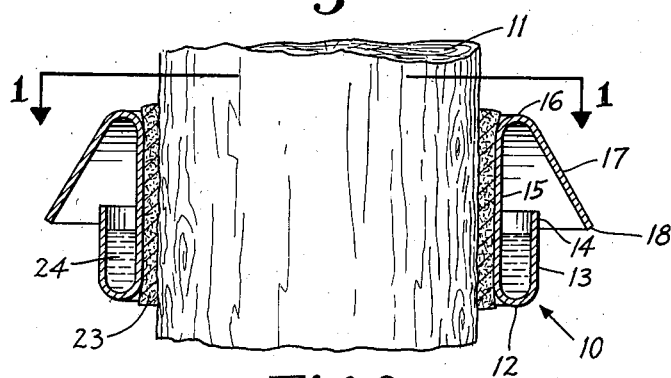
Fig. 2 is a vertical sectional view of the tree cup on line 2—2 of Fig. 1.

There is shown at 10 the tree cup of this invention placed in operative position about a tree trunk 11. Tree cup 10 is made of a single sheet of material, preferably sheet lead, about 3/64 of an inch in thickness. This sheet of lead is folded up at 12 so as to form a trough or oil cup 13, this oil cup 13 being formed by the upwardly extending wall 14 cooperating with the vertically extending inner wall 15. This inner wall 15 extends a substantial distance higher than the lip of the wall 14 and is then folded over as at 16 to provide an angular downwardly extending roof 17, it being observed that the lowermost tip 18 of the roof 17 is slightly below the uppermost edge of the vertical wall 14 of trough 13. At one end the wall 14 is provided with an upwardly extending tongue 20 which is bent as at 21 after the tree cup has been bent or folded about the tree trunk 11 to a substantially cylindrical shape. The upper vertically extending ends of the walls 14, 15 and roof 17 are interlapped as shown in Fig. 3 to provide an expansion joint, a thin film of heavy tough grease 22 being interposed between the interlapping ends.

Figure 3:
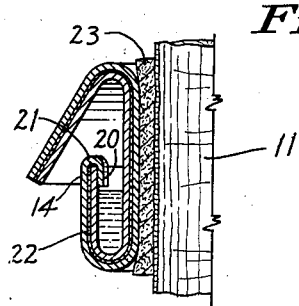
Fig. 3 is a sectional view on line 3—3 of Fig. 1 showing the expansion joint.

In placing the tree cup 10 on the trunk 11 a belt 23 consisting of felt packing about 1/4 of an inch thick and about 3 inches wide is first placed about the tree trunk and the tree cup 10 is then folded therearound with its ends in interlapped position, as shown in Fig. 3, after the film of grease 22 has been placed in position, the tongue 20 being then folded about as at 21 to hold it in position.

Due to the fact that the preferable material is sheet lead, the tree cup 10 can be easily molded or fitted about the tree trunk to take care of any irregularities in the surface thereof while the lapping ends can be easily fitted one within the other. After the tree cup 10 is in position it is filled with a suitable oil or other liquid 24 which is either repellent or poisonous to the crawling insects which are to be controlled. If desired, the liquid 24 may be poured on the felt 23 to saturate the same. The gap between the upper edge of the outer wall 14 and the lower edge 18 of roof 17 must be too great for the insects to bridge, thereby causing insects attempting to climb the outer surface of wall 13 to be either repelled or killed by the liquid 24. By having the outer edge 18 of roof 17 come below the top edge of wall 13, the entrance of leaves, dirt or water or rain is prevented, thus eliminating pollution or loss of liquid 24.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

A tree cup or protector comprising a one piece sheet of yieldable material having a lower folded edge having an upwardly extending portion to provide a trough and an upper folded edge extending downwardly and outwardly over said trough to provide a roof, the trough being adapted to be folded about a tree trunk so as to have its vertical edges interlapped to provide an expansion joint, and an upstanding tongue extending from one edge of the trough adjacent the vertical end adapted to be folded over the overlapping edge to yieldably lock the joint into position, the lower edge of said roof extending outwardly away from and vertically below the upper edge of the trough.

ARVIL J. TORBETT.